United States Patent Office 3,449,153
Patented June 10, 1969

3,449,153
PROCESS FOR THE PREPARATION OF VAPOR-PERMEABLE POLYURETHANE FILMS
Claude Saligny and Jaques Lyonnet, Lyon, France, assignors to Societe Rhodiaceta, Paris, France, a French body corporate
No Drawing. Filed Dec. 2, 1964, Ser. No. 415,496
Claims priority, application France, Dec. 6, 1963, 956,327; June 26, 1964, 979,845
Int. Cl. 44d *1/44;* C08d *13/16;* B29d *27/00*
U.S. Cl. 117—63         7 Claims

ABSTRACT OF THE DISCLOSURE

Microporous polyurethane films are made by depositing on a support a layer of a solution of a polyurethane in a water-miscible solvent, and bathing the said layer with water at 80° to 100° C.

---

This invention relates to the preparation of microporous films based on linear polymers containing urethane groups. By films as used herein is meant a plane or diversely shaped object possessing two dimensions which are large in relation to the third.

Films which are permeable, especially to air and water vapour, have recently acquired great importance, more particularly in products used as leather substitutes. However, hitherto substitute films based on synthetic polymers currently employed have not been sufficiently permeable. Therefore, in order to improve this permeability, it has been proposed, for example, to pierce an insufficiently permeable film with needles. The pores thus obtained are regular, but of relatively large diameter.

In order to produce more highly permeable films, it has also been proposed to mix pore-producing agents with solutions of polymers, to convert these solutions into films by evaporation of the solvents, and then to form pores by appropriate means. The films thus prepared generally contain visible pores which are somewhat non-uniform in dimensions and distribution, so that these films are still unlike natural products.

More recently, it has been proposed (see United States Patent No. 3,000,757) to shape into layers, solutions of polymers containing urethane groups in hygroscopic solvents, to expose the layers thus formed to a moisture-charged atmosphere maintained approximately at ambient temperature, and then to eliminate the residual solvent, either by washing with water or by evaporation at ambient temperature or at elevated temperature.

The films thus prepared, which are comparable with natural products, generally have invisible pores, but this method has some practical defects. More particularly, in order to obtain products of permeability comparable with natural products, it is necessary to expose the shaped layers to a moisture-charged atmosphere for a fairly long time, so that the cost of the products is greatly increased.

Accordingly, in order to reduce the cost, it has been proposed (see French Patent No. 1,355,577), immediately the polymer solution has been shaped into a layer, to immerse the said layer, without further prior treatment, in successive baths consisting of homogeneous mixtures of liquids which are non-solvents for the polymer and liquids which are solvents for the polymer and miscible with the non-solvents, the concentration of non-solvent increasing, and the concentration of solvent therefore decreasing, in each successive bath. By this process, it is possible to obtain more rapidly and more economically films comparable with those obtained by the moist-air method; but the process is not entirely satisfactory industrially because, on the one hand, the production times remain fairly long, and, on the other, the films prepared are too highly grained in appearance and often tend to curl up.

The present invention provides a process for preparing microporous films based upon linear polymers containing urethane groups which takes in general less time that the known processes and gives products which have an appearance which has hitherto been very difficult to obtain.

The new process comprises depositing on a support a layer of a solution in a water-miscible solvent containing at least one water-insoluble linear polymer comprising polyurethane units, subjecting the said layer to the action of water at a temperature between 80° and 100° C., removing the residual solvent by washing, and drying the film. The dried film may then, if desired, be detached from the support. In a preferred embodiment of the new process, the treatment with water is preceded by partial evaporation of the solvent for the polymer.

Since it is generally desired to obtain an isolated film, the polymer solution is ordinarily shaped on a support to which it does not adhere: e.g. glass or stainless steel plate, or sheets of ethylene glycol polyterephthalate, polyethylene, a polyfluorocarbon or a silicone. However, it is possible to carry out the shaping on a substratum to which the layer does adhere. In this case, it is preferable for the substratum to possess good permeability to air and water vapour in order not to reduce the microporosity of the whole. More particularly, woven knitted and non-woven fabrics and paper may be employed as such substrata.

In the new process, the solvent for the polymer may be any known solvent for such polymers, and is preferably dimethylformamide.

In the majority of cases, the process is advantageously carried out under atmospheric pressure. By operating under pressure, substantially identical results are obtained.

Likewise, the new process may be employed in an installation designed for the continuous production of films by the new process. The layer is formed on a travelling belt, on which, if desired, the substratum which it is desired to cover has previously been placed, and then, as it is formed, gradually immersed in the hot water. It may then happen that, probably because of the low speed of immersion of the layer in the hot water, the products obtained have regular striations perpendicular to the direction of travel of the film in the water, the spacing between these striations being essentially a function of the speed of immersion. This defect may be eliminated by adding to the water a small proportion of surface-active agent. Known surface-active compounds may be employed for this purpose, for example alkylaryl sulphonates, notably of sodium, polyethylene glycol oleates and laurates, lauryl alcohol polyethoxyethers, and alkylphenols condensed with aldehyde and sulphated. The surface-active agent advantageously represents from 0.1% to 0.5% of the weight of the water.

In many cases, partial drying of the shaped layers before they are immersed in the hot water greatly reduces their tendency to curl up and improves their external appearance. This drying may advantageously be effected for 1 to 5 minutes in an atmosphere maintained at about 70° C. It has been found that it is possible to operate in a dry atmosphere, which clearly shows that microporous films can be obtained without subjecting the layer of solution to the action of atmospheric moisture.

Generally speaking, it seems that, for a particular polymer solution, the dimensions of the pores depend to a large extent upon the temperature of the water, the residence time in the water, and the duration of the preliminary treatment (when employed), and that the external appearance of the film obtained is influenced by the temperature of the water (the higher this temperature, the more regular is the appearance of the film obtained).

The new process possesses the following advantages, inter alia, over known procedures already discussed. The recovery of the water-miscible solvent is facilitated and the production times are generally substantially below those of prior processes. The films obtained have improved mechanical properties, possess a regular external surface, and generally do not have any troublesome tendency to fold or curl up. Moreover, in the new process, if films prepared on a substratum are processed, it is found that they adhere better to the substratum than films prepared by the prior processes.

The microporous films prepared in accordance with the invention have qualities comparable with those of films obtained by known processes, and may therefore be employed with advantage in many fields, more particularly as substitutes for leather.

In the following illustrative examples, the permeability to water vapour (P.V.E.) is measured by the method of Kanagy and Vickers, described in "Journal of American Leather Chemists Association," 45, 211–242 (Apr. 19, 1950), using a cup 70 mm. in diameter filled with calcium chloride granules, working in an atmosphere of 68.6% relative humidity at a temperature maintained at 30° C.

EXAMPLE 1

A solution containing 12 g. of a polyester urethane (brand "Texin 480 A") in 88 g. of dimethylformamide is prepared. This solution in uniformly deposited on a glass plate using a doctor, so as to obtain a film $120/100$ mm. thick. This film in immersed for two minutes in water at 95° C. and then in water at about 20° C. for 15 minutes. After drying in air at 60° C., a film is obtained which has a very regular surface appearance, a thickness of $20/100$ mm., and a P.V.E. of 20 g./m.$^2$/hour.

To obtain a similar film by the moist air process, it is necessary to expose the polymer solution for 80 minutes to an atmosphere of 65% relative humidity at 23° C. When using the successive-bath method, it is necessary to immerse the solution for about 20 minutes in an aqueous dimethylformamide bath of gradually decreasing dimethylformamide concentration, and for 10 minutes in pure water.

EXAMPLE 2

A polyester urethane is prepared in the following manner: Into a round-bottomed flask provided with a fractionating column adapted to operate in vacuo and connected to a nitrogen supply are introduced: purified adipic acid (1460 g., 10 moles), ethylene glycol (496 g., 8 moles), and 1,2-propylene glycol (304 g., 4 moles). This mixture is heated for 4 hours in a nitrogen atmosphere. An increasing vacuum is then gradually set up in the apparatus so as to maintain the water distillation. After ripening for 10 hours under 10 mm. Hg at 200° C., a colourless, viscous polyester having a molecular weight of 1730 is obtained.

50 g. of this polyester are introduced into a round-bottomed flask provided with a stirrer and nitrogen circulation. After heating to 100° C., 14.5 g. of 4,4′-diisocyanatodiphenylmethane are added. After dissolution, the heating is continued for 3 hours. After cooling, the reaction product is dissolved in 300 cc. of dimethylformamide, and 20 cc. of a solution containing 1.45 g. of hydrazine hydrate in dimethylformamide are then added. A clear, colourless, viscous solution is obtained, which is concentrated to a solids content of 30% by weight by distillation in vacuo.

By means of a doctor casting device, this solution is spread on a glass plate in a film $70/100$ mm. thick. The film thus obtained is placed for 3 minutes in an oven at 70° C., and then immersed for one minute in water at boiling point. The residual solvent is eliminated by washing in water at ambient temperature. After drying at 60° C., a film is obtained which has a regular surface appearance, a thickness of $30/100$ mm., and a P.V.E. of 40 g./m.$^2$/hour.

To prepare a similar film by the moist air process, it is necessary to expose the polymer solution for about 30 minutes to an atmosphere of 63% relative humidity at 23° C. When employing the successive bath method, it is necessary to immerse the solution for 7 minutes in an aqueous dimethylformamide solution of gradually decreasing dimethylformamide concentration, and then in pure water at ambient temperature in order to eliminate the residual solvent.

EXAMPLE 3

The same polyester urethane solution is used as in Example 2. This solution is continuously spread on a smooth conveyor belt advancing at a speed of 30 cm. per minute and forms a film $90/100$ mm. thick. This film is carried by the belt for 3 minutes through a chamber heated at 70° C. and then for 1 minute through a boiling water bath containing 0.3% by weight of sodium dibutylnaphthalene sulphonate (sold under the registered trademark: "Leonil SA"). After washing and drying at 60° C., again continuously, a film free from defects and having a P.V.E. of 54 g./m.$^2$/hour is obtained.

By proceeding under the same conditions, but with a bath of pure water, a film is obtained which shows striations perpendicular to the direction of advance of the film and spaced about 3 mm. apart. This film has a P.V.E. of 41 g./m.$^2$/hour.

EXAMPLE 4

From the same solution, and using the same casting device as in Example 2, a series of films $70/100$ mm. thick is obtained, which is continuously passed for 3 minutes through an oven adjusted to 70° C. Each film is then immersed in a water bath, the temperature of the water varying from one bath to the other and the immersion time being so adjusted as to obtain products possessing a similar P.V.E. After immersion, each film is washed for 15 minutes in water at ambient temperature and then dried at 60° C.

It is clearly apparent from the results set out in the following Table I that, as the temperature of the immersion bath decreases, the time necessary for the processing increases and the surface condition deteriorates (at immersion bath temperatures below 80° C., the surface condition is no longer satisfactory). The films obtained at elevated temperature are readily detached from the glass plate by means of a scraper and show no tendency to fold or to curl up.

TABLE I

| Temperature of the immersion bath ° C. | Immersion time (minutes) | External appearance of the final product |
|---|---|---|
| 100 | 1 | Regular. |
| 90 | 2 | Good. |
| 80 | 3 | Acceptable. |
| 50 | 5 | Tendency to curl, pores visible. |
| 20 | 7 | Strong tendency to curl, surface irregular. |

EXAMPLE 5

The preceding example is repeated with one modification. The atmosphere of the oven is maintained anhydrous with a cup filled with phosphorus pentoxide. No appreciable difference is observed between the films thus obtained and those prepared as in Example 4.

EXAMPLE 6

A polymer solution is prepared as in Example 2, but immediately after it has been shaped into a layer the solvent is evaporated in the open air. In all cases, regardless of the speed of evaporation, films impermeable to water vapour are obtained at temperatures above 40° C. This clearly shows that drying of the shaped layers prior to immersion, even in the presence of atmospheric humidity, cannot in itself produce the desired microporosity.

EXAMPLE 7

Example 4 is repeated, but without pre-drying of the layer of polymer solution. The results set out in the following Table II show that, as in Example 4, as the immersion temperature decreases, the time necessary for the processing increases, and the surface appearance deteriorates. While the P.V.E. of these films is higher than those of the films obtained in Example 4, the surface condition at immersion bath temperatures below 80° C. is not satisfactory.

TABLE II

| Temperature of the immersion bath ° C. | Immersion time (minutes) | External appearance of the final product |
| --- | --- | --- |
| 100 | 2 | Regular. |
| 90 | 2 | Acceptable. |
| 80 | 3 | Poor. |
| 50 | 5 | Bad, some pores visible tendency to curl. |
| 20 | 7 | Pores visible, grained surface, considerable shrinkage, curling. |

EXAMPLE 8

A poylmer urethane is prepared in the following manner. Into a round-bottomed flask under a nitrogen atmosphere are introduced propylene glycol polyether, molecular weight 2025 (brand Emkapyl) (101.25 g., 0.05 mole) and 4,4'-diisocyanatodiphenylmethane (25 g., 0.1 mole). This mixture is heated on the water bath for 3 hours with stirring. The polyether diurethane thus obtained is dissolved in 700 cc. of dimethylformamide, and a solution containing 2.5 g. of hydrazine hydrate dissolved in 100 cc. of dimethylformamide is then added. A viscous solution is obtained, which is concentrated to solids content of 30% by weight by distillation in vacuo.

This solution is brought into the form of a film $7\%_{100}$ mm. in thickness on a glass plate using a casting device comprising a doctor. The film is immersed for 2 minutes in water maintained at about 90° C. and then for 15 minutes in water at ambient temperature. After drying at 60° C., a film is obtained which has a regular surface appearance, a thickness of $30/_{100}$ mm., and a good P.V.E.

We claim:
1. In a process for the preparation of a microporous film by depositing on a support a layer of a solution in a water-miscible solvent of at least one water-soluble linear polymer comprising polyurethane units exposing the said layer of solution to moisture, removing the residual water-miscible solvent by washing, and drying the microporous film formed, the improvement which consists in exposing the said layer of solution to moisture only by bathing the said layer with liquid water at 80° to 100° C.
2. The improvement of claim 1 wherein the bathing with liquid water is preceded by partial evaporation of the water-miscible solvent.
3. The improvement of claim 1, wherein the layer of polymer solution is directly bathed with liquid water heated between 90° and 100°.
4. The improvement of claim 1, wherein the water-miscible solvent is partially evaporated from the layer of solution for one to five minutes in air heated at about 70° C., and the resultant skin is then bathed with liquid water at a temperature between 80° and 100° C.
5. The improvement of claim 1 wherein the water-miscible solvent is dimethylformamide.
6. The improvement of claim 1, wherein the liquid water contains a small proportion of a surface-active agent.
7. The improvement of claim 6, wherein the liquid water contains 0.1–0.5% of surface-active agent.

References Cited

UNITED STATES PATENTS

| 3,000,757 | 9/1961 | Johnston et al. | 117—63 |
| 3,100,721 | 8/1963 | Holden | 117—63 X |
| 3,190,766 | 6/1965 | Yuan | 117—63 |
| 3,208,875 | 9/1965 | Holden | 117—63 X |
| 3,296,016 | 1/1967 | Murphy | 117—63 X |

WILLIAM D. MARTIN, *Primary Examiner.*

M. LUSIGNAN, *Assistant Examiner.*

U.S. Cl. X.R.

117—155, 161; 264—41, 216

PO-1050
(5/69)

UNITED STATES PATENT OFFICE
CERTIFICATE OF CORRECTION

Patent No. 3,449,153　　　　　　　　　Dated June 10, 1969

Inventor(s) Claude Saligny et al

It is certified that error appears in the above-identified patent and that said Letters Patent are hereby corrected as shown below:

Column 3, line 33, "in" should be --is--

Column 5, line 25, "polymer" should be --polyether--

Column 6, line 4, "water-soluble" should be --water-insoluble--

Column 6, line 16, "100°" should be --100°C.--

SIGNED AND
SEALED
MAR 2 1971

(SEAL)
Attest:

Edward M. Fletcher, Jr.
Attesting Officer

WILLIAM E. SCHUYLER, JR.
Commissioner of Patents